(12) United States Patent
Susarla et al.

(10) Patent No.: US 7,571,354 B2
(45) Date of Patent: Aug. 4, 2009

(54) SYSTEM AND METHOD FOR REQUEST ROUTING

(75) Inventors: Hanumantha Rao Susarla, Bangalore (IN); Seema D. Alevoor, Bangalore (IN); Harichandra Reddy Sannapa Reddy, Bangalore (IN)

(73) Assignee: Sun Microsystems, Inc., Santa Clara, CA (US)

( * ) Notice: Subject to any disclaimer, the term of this patent is extended or adjusted under 35 U.S.C. 154(b) by 1453 days.

(21) Appl. No.: 10/434,939

(22) Filed: May 9, 2003

(65) Prior Publication Data

US 2004/0225922 A1    Nov. 11, 2004

(51) Int. Cl.
*G06F 11/00* (2006.01)

(52) U.S. Cl. ............... 714/38; 707/8; 710/200

(58) Field of Classification Search ........ 714/4, 714/39, 38, 55; 707/8; 710/200; 718/104
See application file for complete search history.

(56) References Cited

U.S. PATENT DOCUMENTS

| | | | |
|---|---|---|---|
| 5,530,802 A * | 6/1996 | Fuchs et al. ............... 714/17 |
| 6,067,545 A | 5/2000 | Wolff |
| 6,108,654 A * | 8/2000 | Chan et al. ............... 707/8 |
| 6,185,601 B1 | 2/2001 | Wolff |
| 6,263,368 B1 | 7/2001 | Martin |
| 6,301,676 B1 * | 10/2001 | Kumar et al. ............. 714/11 |
| 6,438,709 B2 * | 8/2002 | Poisner .................... 714/23 |
| 6,467,050 B1 * | 10/2002 | Keung .................... 714/27 |
| 6,574,749 B1 * | 6/2003 | Parsons ................... 714/15 |
| 6,587,966 B1 * | 7/2003 | Chaiken et al. ........... 714/34 |
| 6,687,859 B2 * | 2/2004 | Robsman et al. .......... 714/55 |
| 6,742,135 B1 * | 5/2004 | Wu ........................ 714/4 |
| 6,754,859 B2 * | 6/2004 | Hayden et al. ........... 714/721 |
| 6,983,461 B2 * | 1/2006 | Hutchison et al. ......... 718/104 |
| 7,010,724 B1 * | 3/2006 | Hicok ..................... 714/39 |
| 7,028,300 B2 * | 4/2006 | Goldick ................... 718/104 |
| 2001/0042198 A1 * | 11/2001 | Poisner .................... 713/2 |
| 2003/0167268 A1 * | 9/2003 | Kumar et al. ............. 707/8 |

(Continued)

OTHER PUBLICATIONS

Zhang et al. "OGUPSA Sensor Scheduling Architecture and Algorithm," Department of Electrical and Computer Engineering, George Mason University, Jun. 1998, (8 pages).

(Continued)

*Primary Examiner*—Christopher S McCarthy
(74) *Attorney, Agent, or Firm*—Robert C. Kowert; Meyertons, Hood, Kivlin, Kowert & Goetzel, P.C.

(57) ABSTRACT

A method and a system for request routing may include a router configured to forward a request to a process. The process may acquire a lock on a memory object. If the process is becomes hung, a data synchronizer may release the lock on the memory object assigned to the process. The lock on the memory object assigned to the process may be released after the process is detected to be hung and after another process requests a lock to the memory object. The router may list inactive processes, and if the process is hung, add the process to the list of inactive processes. The router may be configured to check the inactive list and not route requests to processes on the inactive list. The data synchronizer may be configured to prevent processes on the inactive list from modifying data.

51 Claims, 7 Drawing Sheets

U.S. PATENT DOCUMENTS

| | | | |
|---|---|---|---|
| 2004/0054861 A1* | 3/2004 | Harres | 711/163 |
| 2004/0243709 A1 | 12/2004 | Kalyanavarathan et al. | |
| 2004/0249945 A1* | 12/2004 | Tabuchi et al. | 709/225 |
| 2005/0022202 A1 | 1/2005 | Sannapa Reddy et al. | |
| 2005/0172297 A1* | 8/2005 | Garcia | 719/310 |
| 2005/0192971 A1* | 9/2005 | Tabbara et al. | 707/10 |
| 2006/0053111 A1* | 3/2006 | Bradley | 707/8 |
| 2006/0190453 A1* | 8/2006 | Colrain et al. | 707/8 |

OTHER PUBLICATIONS

Kee et al., "A Robust Dynamic Load-Balancing Scheme for Data Parallel Application on Multicomputer Systems," Abstact, 1999, (17 Pages).

* cited by examiner

US 7,571,354 B2

SYSTEM AND METHOD FOR REQUEST ROUTING

BACKGROUND OF THE INVENTION

1. Field of the Invention

This invention relates to computer hardware and software, and more particularly to software programs for request routing.

2. Description of the Related Art

Application servers may be part of a three-tier architecture that includes functionality for a user interface (such as a user web browser), logic execution (performed at least partially by or within the application server), and management of user session data using shared memory objects, and data storage and retrieval (such as using memory objects). Application servers may receive requests from the user interface tier (such as, but not limited to, a request for a hyper text transfer protocol (HTTP) document from a user web browser) to be fulfilled by a process on the application server. The process on the application server may require access to a session memory object in order to provide the requested information. Some requests may also cause a process to modify a memory object. For example, a request may include shopping cart list information from a client to be stored in the application server's memory object representing the client's session data and later, on getting the order request from the client, needs to be stored in a database. Therefore, the process, while storing the session data, may need to request a lock to the memory object that stores the information it needs to change to prevent another process from accessing the memory object while the process is modifying data in it.

While processing a request, the process on the application server may become hung. For example, a process may get stuck in a loop or get stuck on a portion of corrupt code. When a process becomes hung, it may hold a lock on a memory object that other processes need. In this case, the other processes may slow down or halt while they are waiting for the memory object to become available. In addition, a hung process may write corrupt data to the memory object.

SUMMARY OF THE DISCLOSURE

In one embodiment, a system may include one or more processors and a memory coupled to the one or more processors to store program instructions executable by the one or more processors to implement an application server. The application server may be configured to implement a router that is configured to forward requests to processes to handle the requests. The router may be further configured to detect if a process is hung, and if the process is hung, may assign the request to another process that is not hung. In addition, application server may release one or more locks on one or more memory objects held by a process determined to be hung. In one embodiment, a lock on a memory object held by a hung process may be released after the process is detected to be hung and once another process requests a lock to that memory object. In one embodiment, a lock held by a hung process may be released upon detecting the process to be hung.

In one embodiment, if a request routed to a process times out, detecting if the process is hung may include sending a dummy request to the process. If the initial request does not time out, the process may be considered active. If the initial request and dummy request time out, the process may be considered to be hung, and if the dummy request does not time out, the process may be considered active. In one embodiment, application server may be further configured to maintain a list of inactive processes, and if the process is detected to be hung, add the process to the list of inactive processes. A data synchronizer may also access the list of inactive processes. In one embodiment, the application server may be further configured to remove a process from the list of inactive processes if the process becomes active after the process has been added to the list of inactive processes. In one embodiment, the data synchronizer may prevent hung processes from modifying data.

BRIEF DESCRIPTION OF THE DRAWINGS

A better understanding of the present invention may be obtained when the following detailed description is considered in conjunction with the following drawings.

Figure 1:
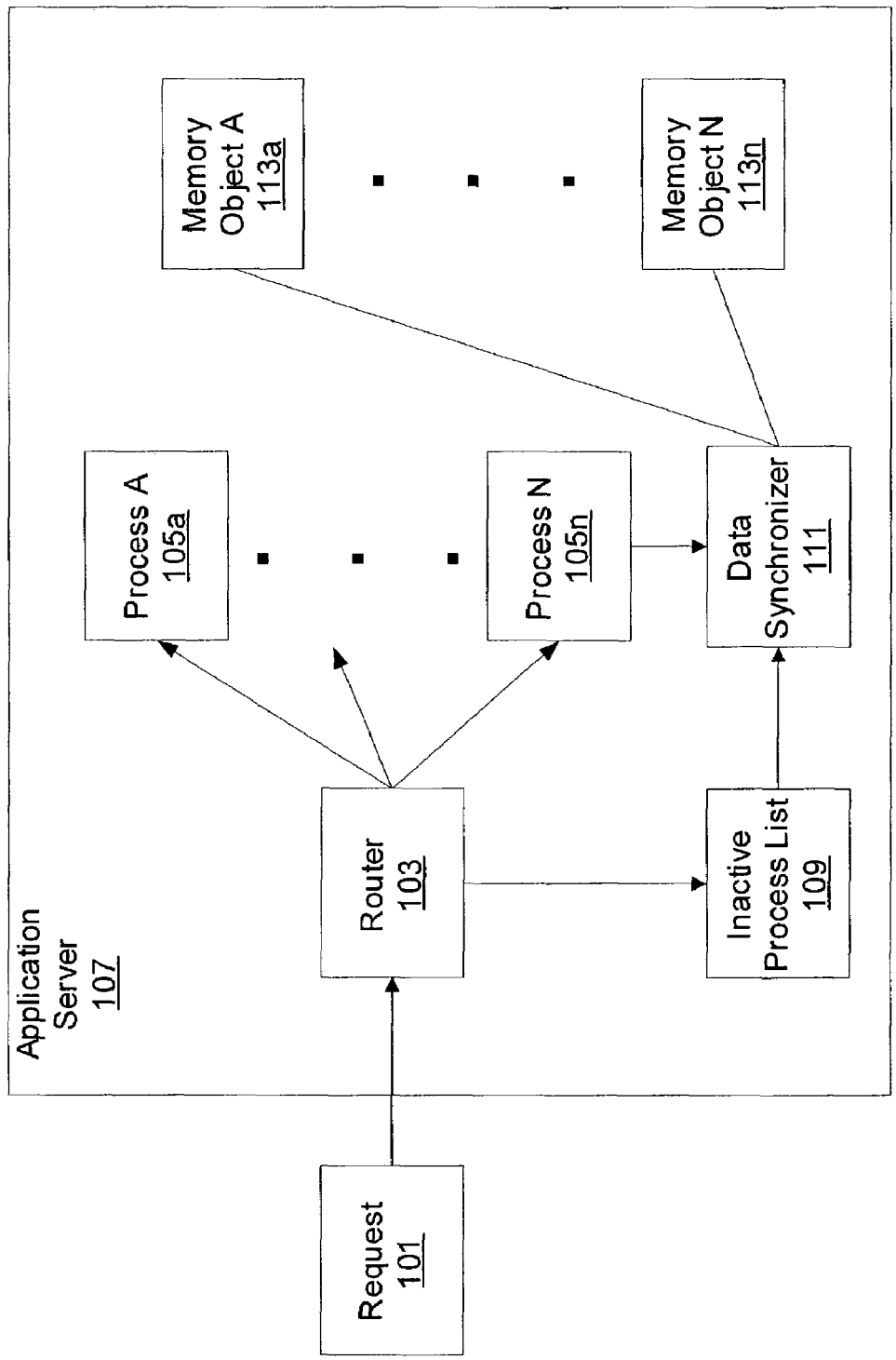
FIG. 1 illustrates a system for request routing, according to one embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the invention as defined by the appended claims.

DETAILED DESCRIPTION OF EMBODIMENTS

Referring to FIG. 1, an embodiment of a system for reliable request routing is shown. An application server 107 may receive a request 101 from a user interface (such as an HTTP request for a web page from a client). In one embodiment, a router 103 implemented by the application server 107 may receive the request 101 and select a process from the processes 105 to process the request 101. While one application server 107 is shown in FIG. 1, the router 103 may route a request 101 to one of several processes on a cluster of application servers in other embodiments. In one embodiment, the request 101 may be kept in a queue until a process becomes available. In one embodiment, a specific process may be needed to process the request. Alternately, several processes 105 may be capable of processing the request 101. In one embodiment, a process 105 may need to access a memory object 113. In one embodiment, a data synchronizer 111 may coordinate processes 105 accessing memory objects 113. If a process 105 needs to modify a memory object 113, the process 113 may request a lock on the memory object 113 from the data synchronizer 111. Other reasons for requesting a lock are also contemplated. In one embodiment, if the data synchronizer 111 provides a write lock for a memory object 113 to a process 105, no other process may be allowed to access the memory object 113 while the write lock is held. If the data synchronizer 111 provides a read lock for a memory object 113 to a process 105, other processes may also be able to obtain read locks, but no other process may be allowed write access to the memory object 113 while a read lock is held.

While the process 105 has a lock assigned to it, the process 105 may become hung. For example, the process may get stuck in a loop or get stuck on a portion of corrupt code. While the process 105 is hung, other processes may not be able to freely access the memory object 113 that is locked by the hung process. In one embodiment, the router 103 may determine if a process 105 has become hung (i.e., become inactive). For example, the router 103 may "ping" the process by sending a dummy request to the process 105 if a previous request sent to the process 105 times out. Other methods for determining if the process 105 is hung are also contemplated. In one embodiment, an inactive process list 109 may be maintained by the router 103 and/or data synchronizer and may contain a list of processes (e.g., a list of process identifications) that are currently deemed inactive (e.g., hung). In one embodiment, another application may maintain the list. In yet another embodiment, the router may maintain an active processes list that contains a list of active processes. Other applications may also be used to maintain the inactive processes list. In one embodiment, the data synchronizer 111 may use the inactive process list 109 to determine whether a process with a lock should keep the lock. For example, a process with a lock may become hung. The data synchronizer 111 may free up the lock when the process becomes hung, or may wait until another process requests a lock to the memory object(s) currently locked by the hung process to release the lock. In one embodiment, the data synchronizer 111 may be notified by the router 103 of the hung process by another method in addition to the inactive process list 109.

Figure 2:
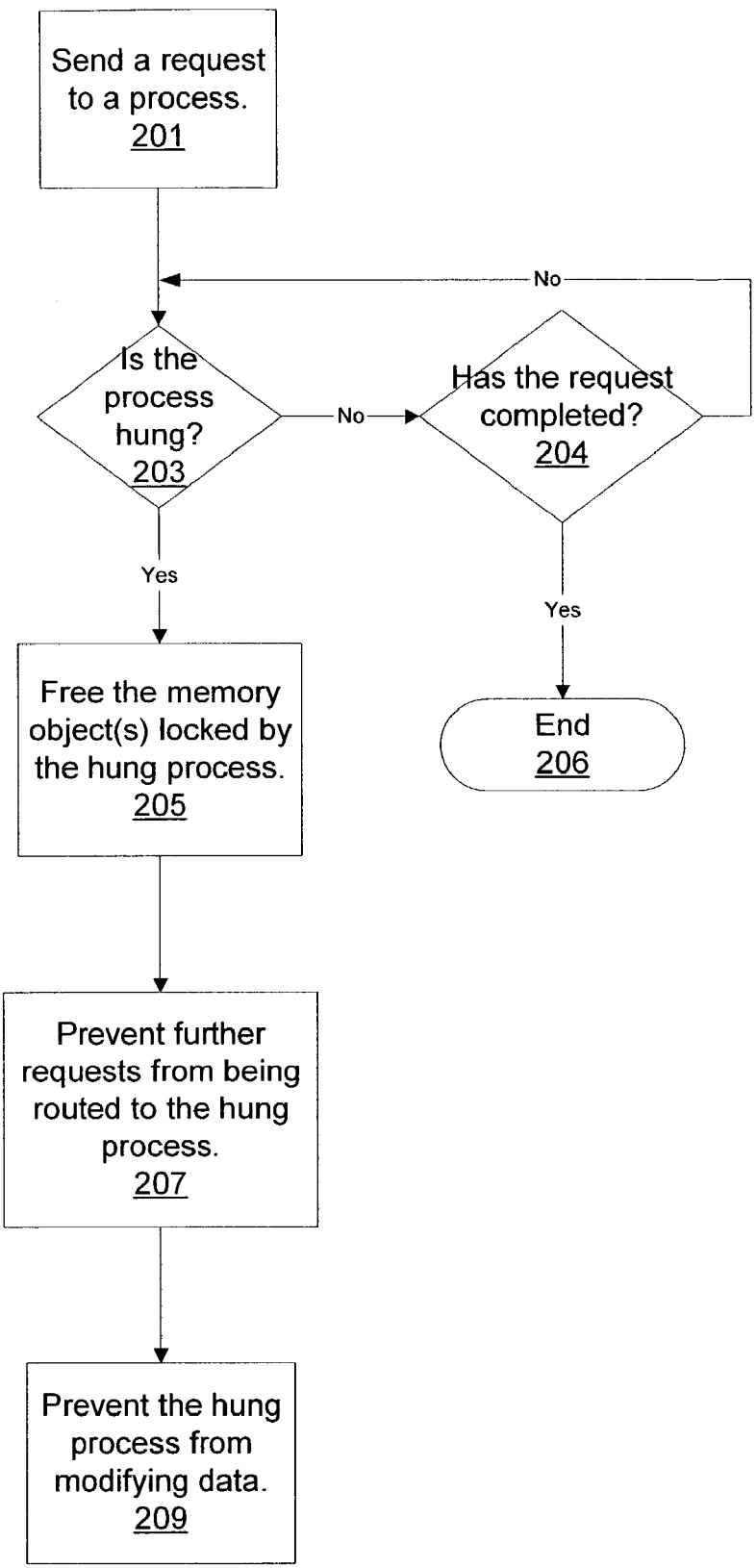
FIG. 2 illustrates a method of request routing, according to one embodiment.

Is Referring to FIG. 2, a flowchart illustrating an embodiment for request routing is shown. It should be noted that in various embodiments of the methods described below, one or more of the processes described may be performed concurrently, in a different order than shown, or may be omitted entirely. Other additional processes may also be performed as desired.

In 201, a request may be sent to a process. For example, the request may be an HTTP request for a web page. In one embodiment, the request may be sent to an available process by an application server. In one embodiment, the process may be one of several processes on a cluster of application servers. Other configurations are also contemplated.

In 203, a determination may be made whether the process is hung. For example, if the request does not complete before a timeout expires (e.g., a timeout that was started when the request was first assigned to the process), a router may consider the process hung. In another embodiment, after the request timeout expires, a dummy request may be sent to the process, and if a timeout for the dummy request also expires before a response is received, the router may consider the process hung. Other methods of determining if a process is hung are also contemplated. Once a process has been determined to be hung, an ID for the hung process may be added to an inactive process list, or alternatively, removed from an active process list. In one embodiment, once a process is considered hung, it may be restarted. In one embodiment, requests may be routed to other processes besides the hung process.

In 204, if the process has not been determined to be hung, a determination may be made whether the request has completed. If the request has completed, the method may end at 206. If the request has not completed, the method may continue at 203 until the process is determined to be hung or the request has completed.

In one embodiment, a process using a memory object may have been given a lock to the memory object by a data synchronizer. The lock may prevent other processes from accessing the memory object while the process has a lock on it. In 205, if a process has been determined to be hung, one or more locks held by the hung process on one or more memory objects may be released. Thus, memory object locked by the hung process may be made available to other processes.

In 207, further requests may be prevented from being routed to the hung process. In one embodiment, the application server may maintain a list of inactive processes and/or active processes. In one embodiment, the request router on the application server may check the list before assigning a request to a process to make sure the process it is about to assign the request to is not hung. If the process is hung, the router may select another process to handle the request. If no other active processes are available that can handle the request, the router may queue the request until a suitable process becomes available or return an error message to the requestor.

In 209, a process determined to be hung may be prevented from modifying data. For example, a hung process may attempt to write corrupt data to a memory object. In one embodiment, a data synchronizer may prevent a hung process from writing data to a memory object.

In one embodiment, a process determined to be hung may be killed and restarted. In other embodiments, a determination may be made whether a hung process has become active again. For example, if the process later responds to the request it was sent, the process may be considered active. Also, if a dummy request sent to the process later completes, the process may be considered active. Other methods for determining if the process has become active again are also contemplated. If a hung process becomes active again, the process may taken off the inactive processes list.

Figure 3:
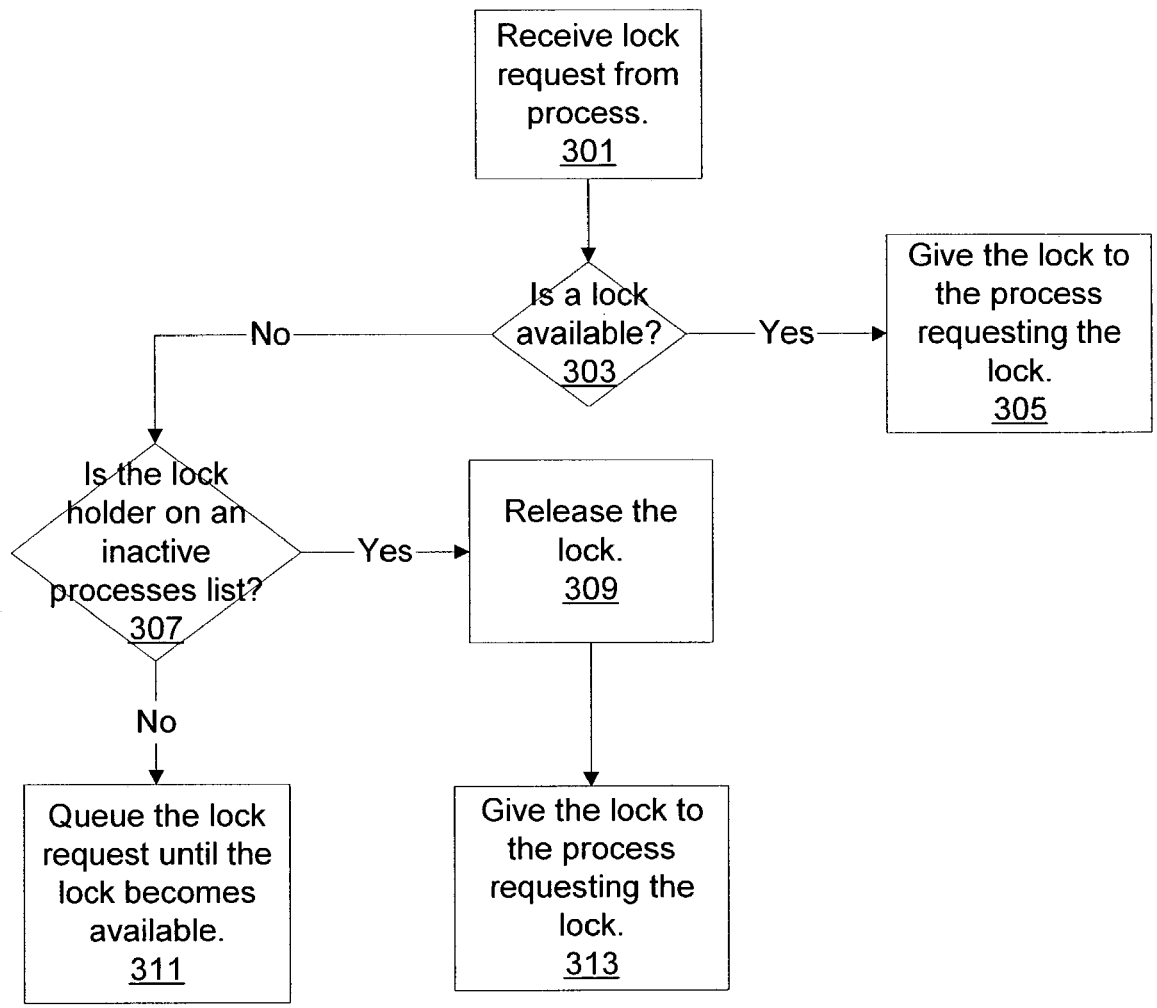
FIG. 3 illustrates assigning locks to active processes, according to one embodiment.

Referring to FIG. 3, a flowchart illustrating an embodiment for data synchronization is shown. It should be noted that in various embodiments of the methods described herein, one or more of the methods described may be performed concurrently, in a different order than shown, or may be omitted entirely. Other additional methods may also be performed as desired.

In 301, a lock request may be received from a process. In one embodiment, a process may need to access a memory object. The process may request a lock on the memory object to prevent other processes from reading or writing to the memory object while the process accesses the memory object. In some embodiments, the lock request may be for a read lock or a write lock for a particular memory object. In another embodiment, the process may have other reasons for having a lock on the memory object.

In 303, a determination may be made as to whether the requested lock is available. In one embodiment, a data synchronizer may check to see if another process already has a lock on the memory object.

In 305, if the lock is available, the lock may be given to the process requesting the lock. For example, if no process currently has a lock on the requested memory object, then the process requesting the lock may be assigned a lock on the memory object.

In 307, if the lock is not available, a determination may be made whether the lock holder is on an inactive processes list. In one embodiment, the data synchronizer may access a list of inactive processes and make a determination whether the lock holder is on the inactive processes list.

In 309, if the lock holder is on the inactive processes list, the lock may be released. In one embodiment, the lock may have been released as soon as the lock holder was put onto the inactive processes list. In another embodiment, the lock may not be released until needed by another process.

In 313, the lock may be given to the process requesting the lock. In one embodiment, the process which previously had the lock may not be allowed to modify the memory object. In some embodiments, the data synchronizer may prevent processes on the inactive list from modifying any memory objects.

In 311, if the lock holder is not on an inactive processes list, the lock request may be queued until the lock becomes available. If the process with the lock becomes hung while the process requesting the lock is in the queue, the lock may be released and given to the process with the lock request in the queue requesting the lock.

Figure 4:
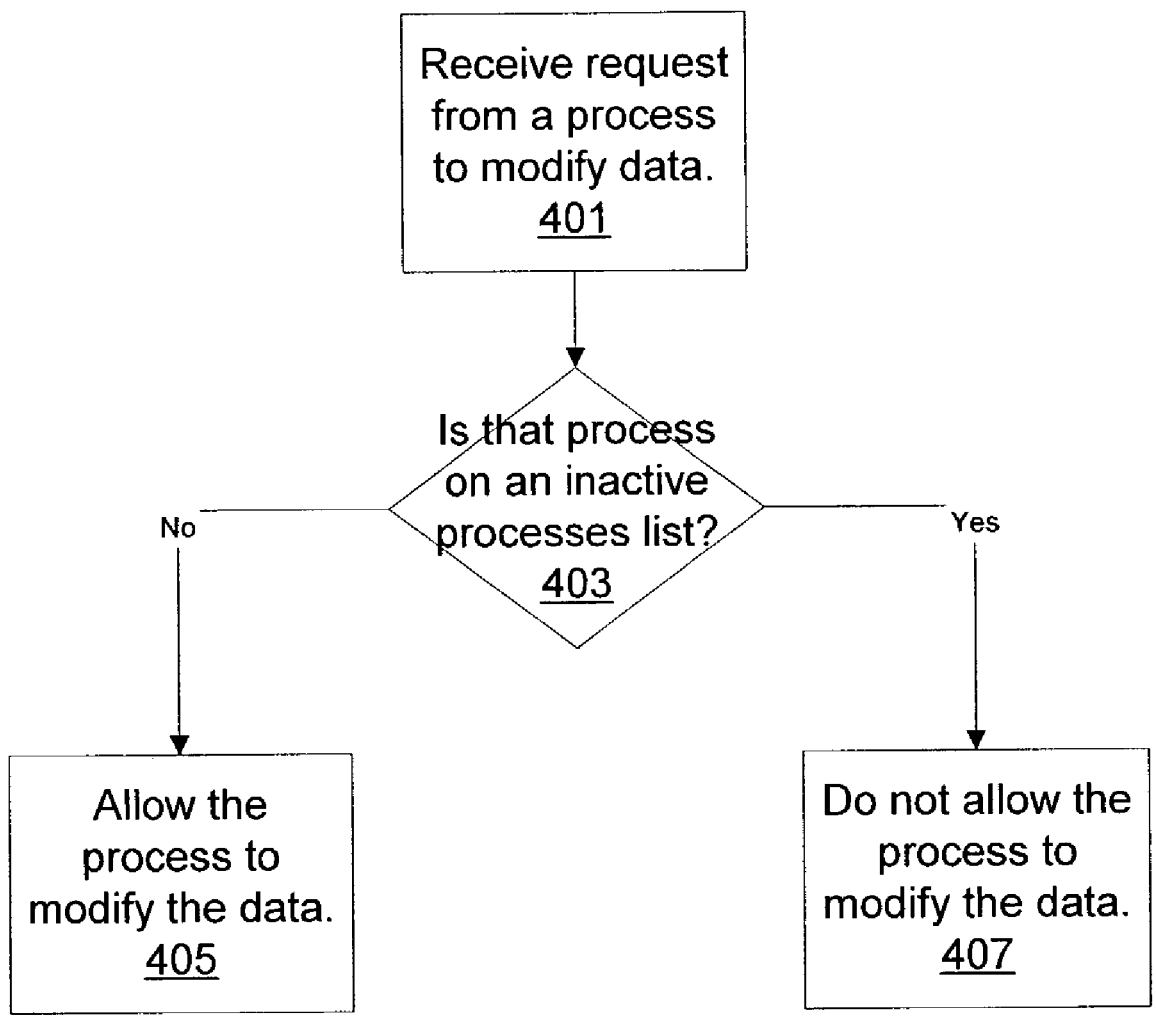
FIG. 4 illustrates a method for determining is a process is allowed to modify data, according to one embodiment.

Referring to FIG. 4, a flowchart illustrating another data synchronization aspect is shown, according to one embodiment. It should be noted that in various embodiments of the methods described herein, one or more of the methods described may be performed concurrently, in a different order than shown, or may be omitted entirely. Other additional methods may also be performed as desired.

In 401, a request may be received from a process to modify data. For example, a process may need to modify data in a memory object. In one embodiment, the process may have a lock on the memory object. In one embodiment, the process may not have a lock on the memory object.

In 403, a determination may be made whether the process is on the inactive processes list. For example, a data synchronizer may access an inactive process list. In one embodiment, the data synchronizer may access a list of active processes instead. Other methods for keeping track of inactive processes are also contemplated.

In 405, if the process is not on the inactive processes list, the process may be allowed to modify the data. In one embodiment, the process may modify the data in the memory object according to a result of processing a client request received from a request router.

In 407, if the process is on the inactive processes list, the process may not be allowed to modify the data. In one embodiment, lock requests may be queued until a requested lock becomes available (e.g., is no longer locked to another process). In one embodiment, a process holding the lock may not be allowed to modify the data if the process is one the inactive list. For example, if the process was hung, the data synchronizer may not allow the process to modify the data because a portion of the process may be corrupt. Other reasons for not allowing the process to modify the data are also contemplated. If a request for a lock held by an inactive process is in the data synchronizer lock request queue, the data synchronizer may release the lock and grant it to the next request for that lock in the queue.

Figure 5:
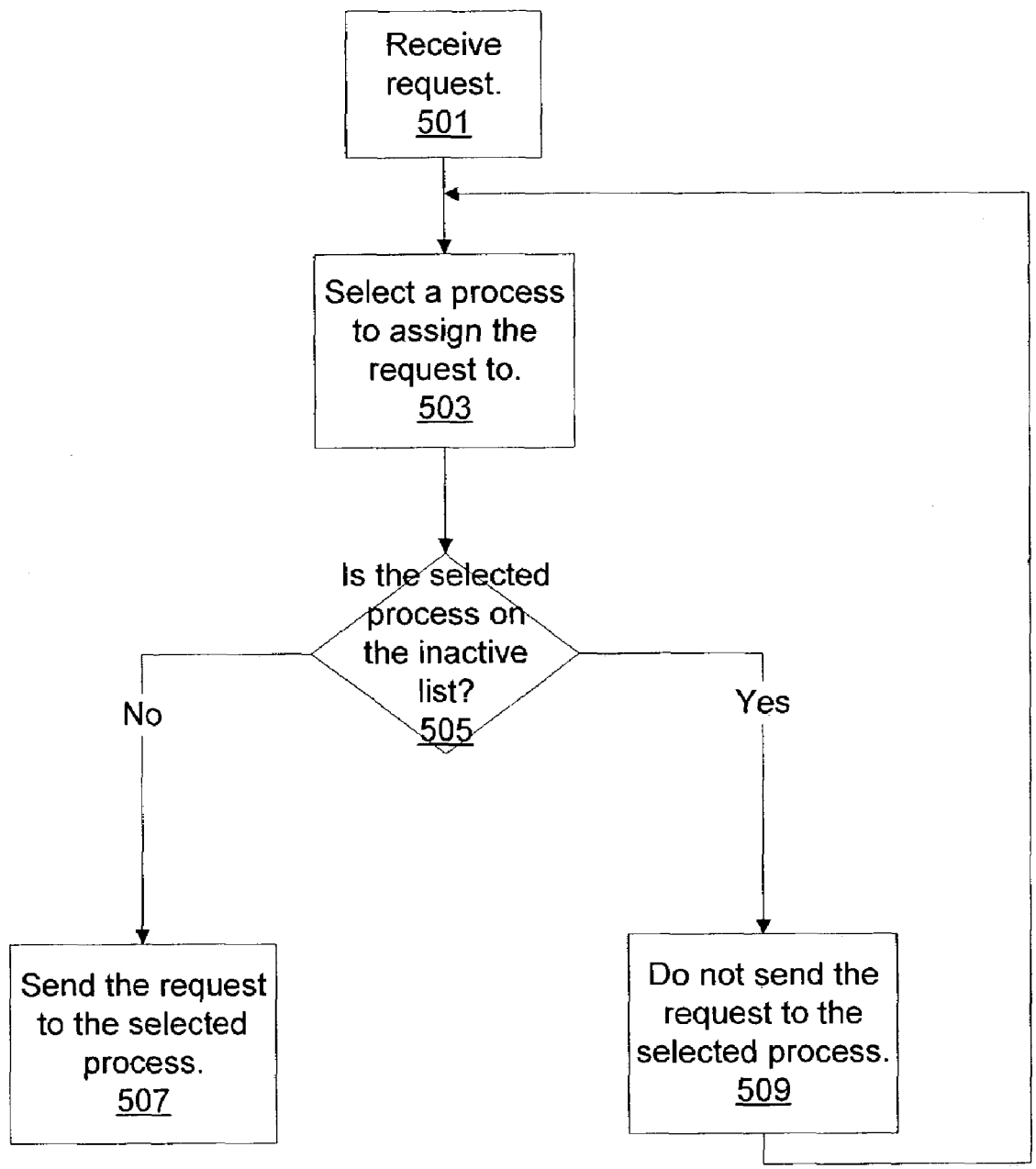
FIG. 5 illustrates a method for an inactive process list, according to one embodiment.

Referring to FIG. 5, a flowchart illustrating an embodiment for using an inactive process list is shown. It should be noted that in various embodiments of the methods described herein, one or more of the methods described may be performed concurrently, in a different order than shown, or may be omitted entirely. Other additional methods may also be performed as desired.

In 501, a request may be received. As stated above, the request may be received by an application server. In one embodiment, the request may be an HTTP request from a client. Other requests are also contemplated.

In 503, a process may be selected to handle the request. In one embodiment, the request may need to be assigned to a specific process. In one embodiment, one of several processes may be able to handle the request. For example, an application server may use a load balancing scheme to select a process to assign the request to.

In 505, a determination may be made whether the selected process is on an inactive process list. In one embodiment, instead of an inactive list, an active processes list may be maintained.

In 507, if the selected process is not on the inactive list, the request may be sent to the selected process.

In 509, if the selected process is on the inactive list, the request may not be sent to the process. In one embodiment, the process may have been added to the active processes list because the process has been determined to be hung. Other reasons for a process being considered inactive are also contemplated. The method may continue at 503 to select another process to send the request to.

Figure 6:
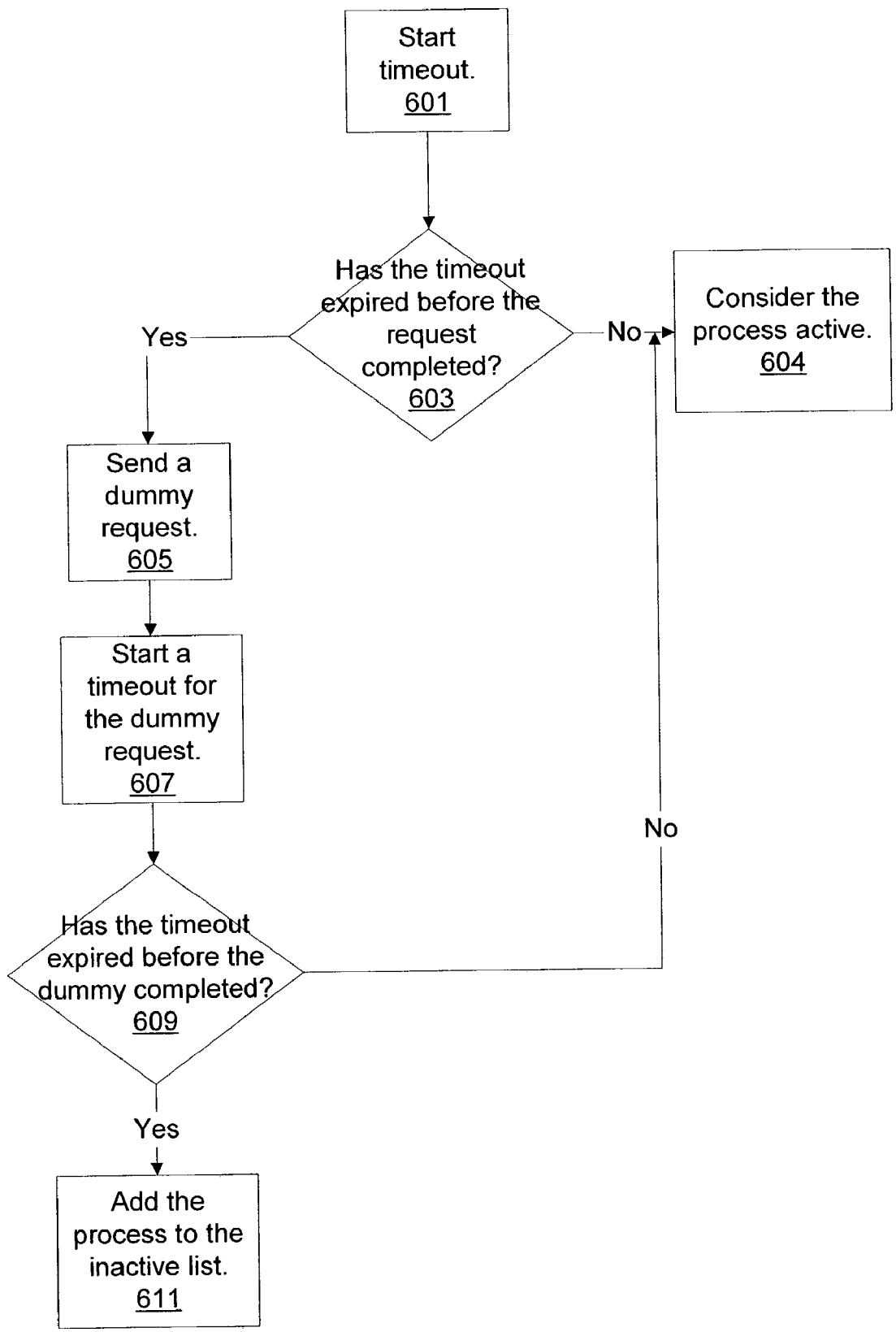
FIG. 6 illustrates a dummy request method to detect a hung process, according to one embodiment.

Referring to FIG. 6, a flowchart for an embodiment of a method of using a dummy request to detect a hung process is shown. It should be noted that in various embodiments of the methods described herein, one or more of the methods described may be performed concurrently, in a different order than shown, or may be omitted entirely. Other additional methods may also be performed as desired.

In 601, a timeout may be started for a request. In one embodiment, a timeout may be started when a request is assigned to a process. In another embodiment, the timeout may be started relative to another event. In one embodiment, the timeout may be a first predetermined amount of time.

In 603, a determination may be made if the timeout has expired before the request completes.

In 605, if the timeout expired before the request completes, a dummy request may be sent to the process that received the request. For example, the dummy request may be a request that the process should be able to complete relatively quickly or may simply require an acknowledgment from the process. In one embodiment, a router may generate and send a dummy request to the process.

In 607, a timeout may be started for the dummy request. In one embodiment, this timeout may be a second predetermined amount of time. In one embodiment, the first predetermined amount of time may be approximately equal to the second predetermined amount of time. In another embodiment, the first predetermined amount of time may be longer or shorter than the second predetermined amount of time.

In 609, a determination may be made whether the dummy request timeout has expired before the dummy request completes.

In 611, if the dummy request timeout expires before the dummy request completes, the process may be added to the inactive list. In one embodiment, the process may be removed from an active process list. If the process later becomes active, it may be taken off the inactive processes list (or added to the active processes list).

In 604, if the request timeout does not expire before the request finishes, or if the timeout for the dummy request does not expire before the dummy request completes, the process may be considered active. In one embodiment, the application server (e.g., a router on the application server) may use another method of tracking active/inactive processes.

Figure 7:
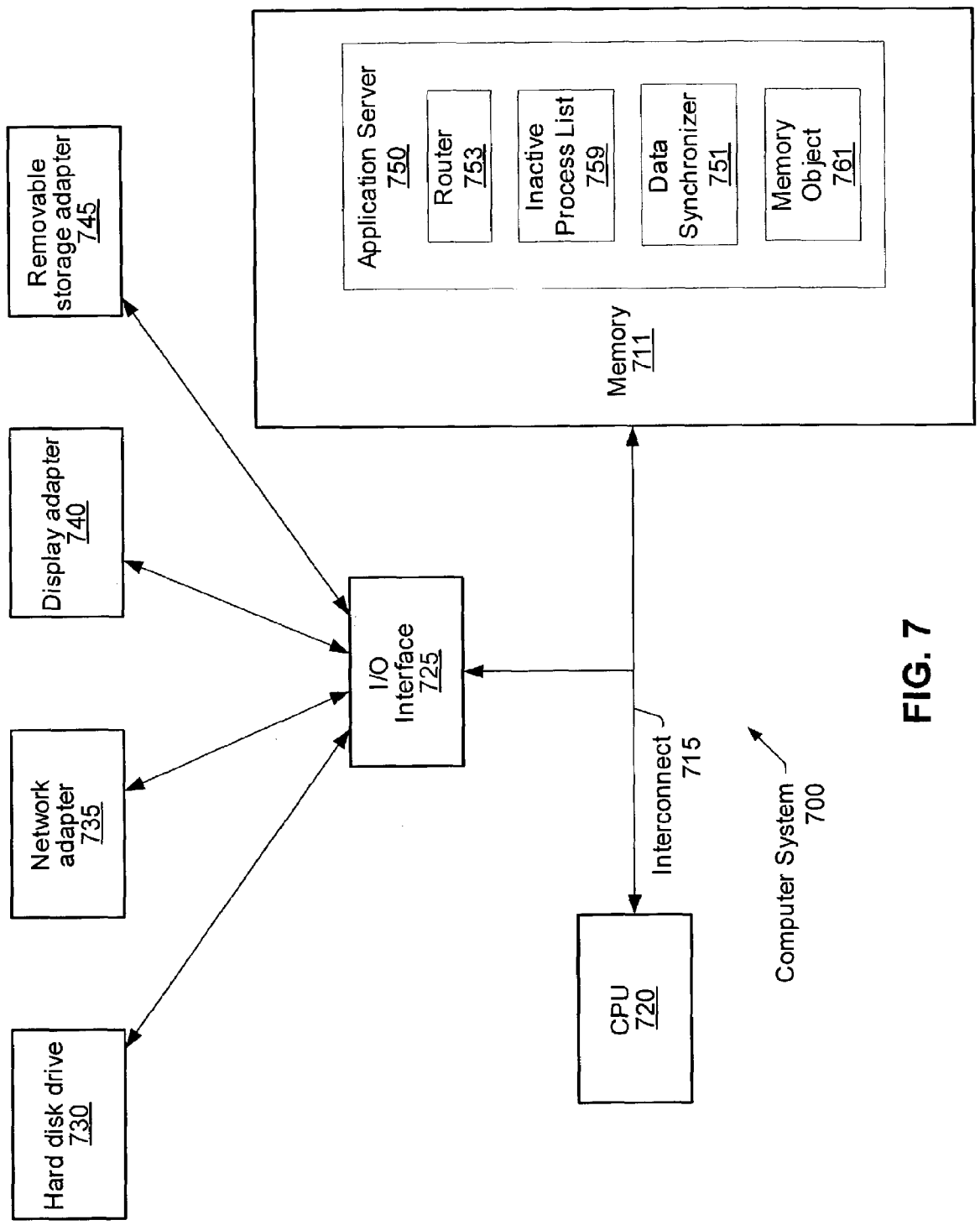
FIG. 7 illustrates a computer system for request routing, according to one embodiment.

Referring to FIG. 7, an embodiment of a computer system for request routing is shown. In one embodiment, a computer system 700 may include a central processing unit (CPU) 720 coupled to a memory 711 and an input/output (I/O) interface 725. In one embodiment, an interconnect 715 may be used to couple the CPU to the memory 711. The memory 711 may store program instructions to implement an application server 750. The application server 750 may include a router 753 and a data synchronizer 751, and may maintain an inactive process list 759. The application server 750 may also have one or more memory objects 761. In one embodiment, the I/O interface 725 may be coupled to a hard disk drive 730, a network adapter 735, a display adapter 740, and a removable storage adaptor 745. Other components may also be coupled to the I/O interface.

Various embodiments may further include receiving or storing instructions and/or information implemented in accordance with the foregoing description upon a computer accessible medium. Suitable computer accessible media may include storage media or memory media such as magnetic or optical media, e.g., disk or CD-ROM, random access memory, or other memory, as well as transmission media or signals such as electrical, electromagnetic, or digital signals, conveyed via a communication medium such as a network and/or a wireless link.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

We claim:

1. A system, comprising:
   one or more processors;
   memory coupled to the one or more processors and configured to store program instructions executable by the one or more processors to implement:
   an application server including a request router, wherein the request router is configured to:
   forward a request received by the application server to a process of the application server; and
   detect if the process is hung; and
   wherein the application server is configured to release one or more memory object locks held by the process in response to detecting the process is hung.

2. The system as recited in claim 1, wherein the application server further comprises a data synchronizer configured to release one of the memory object locks held by the process after the process is detected to be hung and another process requests the lock to that memory object.

3. The system as recited in claim 1, wherein the lock on the memory object assigned to the process is released when the process is detected to be hung.

4. The system as recited in claim 1, wherein to detect if the process is hung, the request router is configured to:
   if the forwarded request times out, send a dummy request to the process;
   if the forwarded request does not time out, consider the process active;
   if the dummy request times out, consider the process hung; and
   if the dummy request does not time out, consider the process active.

5. The system as recited in claim 1, wherein the request router is further configured to:
   maintain a list of inactive processes; and
   add the process to the list of inactive processes if the router detects the process to be hung.

6. The system as recited in claim 5, wherein the router is further configured to remove the process from the list of inactive processes if router detects that the process becomes active after the process is added to the list of inactive processes.

7. The system as recited in claim 1, wherein the application server is configured to not allow a process detected to be hung to modify data.

8. The system as recited in claim 1, wherein to detect if the process is hung, the request router is configured to:
   if the request is not responded to in a first predetermined amount of time, send a dummy request to the process; and
   if the dummy request is not responded to in a second predetermined amount of time, identify the process as a hung process.

9. The system as recited in claim 8, wherein the first predetermined amount of time and the second predetermined amount of time are approximately equal.

10. The system as recited in claim 1, wherein to detect if the process is hung, the request router is configured to:
    start a timeout when the request is forwarded to the process; and
    if the request is not responded to in a predetermined amount of time, identify the process as a hung process.

11. A system, comprising:
    one or more processors;
    memory coupled to the one or more processors and configured to store program instructions executable by the one or more processors to implement an application server including a request router, wherein the request router is configured to:
    forward a request to a process;
    detect if the process is hung; and
    if the process is hung, prevent further requests from being routed to the hung process; and
    wherein the application server is configured to prevent the hung process from modifying data.

12. The system as recited in claim 11, wherein to detect if the process is hung, the request router is configured to:
    if the forwarded request times out, send a dummy request to the process;
    if the forwarded request does not time out, consider the process active;
    if the dummy request times out, consider the process hung; and
    if the dummy request does not time out, consider the process active.

13. The system as recited in claim 11, wherein the router is further configured to:
    maintain a list of inactive processes; and
    if the process is hung, add the process to the list of inactive processes.

14. The system as recited in claim 13, wherein the router is further configured to remove the process from the list of inactive processes if the process becomes active after the process is added to the list of inactive processes.

15. The system as recited in claim 11, wherein the application server is further configured to release a lock on a memory object held by the process if the process detected to be hung.

16. The system as recited in claim 11, wherein to detect if the process is hung, the request router is configured to:

if the request is not responded to in a first predetermined amount of time, send a dummy request to the process; and if the dummy request is not responded to in a second predetermined amount of time, identify the process as a hung process.

17. A system, comprising:
one or more processors;
memory coupled to the one or more processors and configured to store program instructions executable by the one or more processors to implement:
an application server comprising a data synchronizer, wherein the data synchronizer is configured to:
receive a request from a process for a lock for a memory object;
if another process has a lock on the memory object, detect if the process holding the lock is hung;
in response to detecting the process holding the lock is hung, release the lock on the memory object and provide the lock on the memory object to the process requesting the lock; and
if the process is not hung, queue the lock request until the process holding the lock releases the lock or becomes hung.

18. The system as recited in claim 17, wherein the application server further comprises a request router configured to:
forward a client request to a process;
if the forwarded request times out, send a dummy request to the process;
if the forwarded request does not time out, consider the process active;
if the dummy request times out, consider the process hung; and
if the dummy request does not time out, consider the process active.

19. The system as recited in claim 18, wherein the application server is further configured to:
maintain a list of inactive processes; and
if a process determined to be hung, add the process to the list of inactive processes.

20. The system as recited in claim 19, wherein the application server is further configured to remove the process from the list of inactive processes if the process becomes active after the process is added to the list of inactive processes.

21. The system as recited in claim 19, wherein the data synchronizer does not allow processes on the list of inactive processes to modify data.

22. The system as recited in claim 17, wherein to detect if a process is hung, the application server is configured to:
if a request sent to the process is not responded to in a first predetermined amount of time, send a dummy request to the process; and
if the dummy request is not responded to in a second predetermined amount of time, identify the process as a hung process.

23. The system as recited in claim 22, wherein the first predetermined amount of time and the second predetermined amount of time are approximately equal.

24. The system as recited in claim 17, wherein to detect if a process is hung, the application server is configured to:
if the first request is not responded to in a predetermined amount of time, identify the process as a hung process.

25. A method, comprising:
receiving a request from a client;
selecting a process to handle the request;
detecting if the selected process is hung; and
in response to detecting the selected process is hung, releasing one or more memory object locks held by the hung process;
wherein said receiving, said selecting, said detecting, and said releasing are performed by a computer.

26. The method as recited in claim 25, wherein said releasing one or more memory object locks comprises releasing one of the memory object locks after the selected process is detected to be hung and after another process requests a lock held by the selected process.

27. The method as recited in claim 25, wherein said releasing one or more memory object locks comprises releasing the one or more memory object locks when the selected process is detected to be hung.

28. The method as recited in claim 25, wherein said detecting if the selected process is hung comprises:
if the request to the selected process times out, sending a dummy request to the selected process;
if the request does not time out, considering the selected process active;
if the dummy request times out, considering the selected process hung; and
if the dummy request does not time out, considering the selected process active.

29. The method as recited in claim 25, further comprising:
maintaining a list of inactive processes; and
if a process is detected to be hung, adding an identifier for that process to the list of inactive processes.

30. The method as recited in claim 29, further comprising removing a process from the list of inactive processes if that process becomes active after that process was added to the list of inactive processes.

31. The method as recited in claim 25, further comprising preventing the selected process to modify data if the selected process is detected to be hung.

32. The method as recited in claim 25, wherein said detecting if the selected process is hung comprises:
sending the request to the selected process;
if the request is not responded to in a first predetermined amount of time, sending a dummy request to the selected process; and
if the dummy request is not responded to in a second predetermined amount of time, identifying the selected process as a hung process.

33. The method as recited in claim 32, wherein the first predetermined amount of time and the second predetermined amount of time are approximately equal.

34. The method as recited in claim 25, wherein said detecting if the process is hung comprises:
sending the request to the selected process; and
if the request is not responded to in a predetermined amount of time, identifying the process as a hung process.

35. A method, comprising:
receiving a request from a client;
selecting a process to handle the request;
detecting if the selected process is hung; and
if the selected process is hung, preventing further requests from being routed to the hung process and preventing the hung process from modifying the data;
wherein said receiving, said selecting, said detecting, and said preventing are performed by a computer.

36. The method as recited in claim 35, wherein said detecting if the selected process is hung comprises:
if the request to the selected process times out, sending a dummy request to the selected process;

if the request does not time out, considering the selected process active;
if the dummy request times out, considering the selected process hung; and
if the dummy request does not time out, considering the selected process active.

37. The method as recited in claim 35, further comprising:
maintaining a list of inactive processes; and
if a process is detected to be hung, adding an identifier for that process to the list of inactive processes.

38. The method as recited in claim 37, further comprising removing a process from the list of inactive processes if that process becomes active after that process was added to the list of inactive processes.

39. The method as recited in claim 35, further comprising releasing one or more locks held by the selected process on one or more memory objects if the selected process is detected to be hung.

40. The method as recited in claim 35, wherein said detecting if the selected process is hung comprises:
sending the request to the selected process;
if the request is not responded to in a first predetermined amount of time, sending a dummy request to the selected process; and
if the dummy request is not responded to in a second predetermined amount of time, identifying the selected process as a hung process.

41. A method, comprising:
receiving a request from a process for a lock for a memory object, wherein another process has a lock on the memory object;
detecting if the process holding the lock is hung;
if the process holding the lock is hung, releasing the lock on the memory object in response to detecting the process holding the lock is hung, and providing the lock on the memory object to the process requesting the lock; and
if the process is not hung, queuing the request for the lock until the process holding the lock is finished with the memory object or becomes hung;
wherein said receiving, said detecting, said releasing, said providing, and said queuing are performed by a computer.

42. The method as recited in claim 41, wherein said detecting if the process holding the lock is hung comprises:
if a client request to the process holding the lock times out, sending a dummy request to the that process;
if the client request does not time out, considering the process holding the lock to be active;
if the dummy request times out, considering the process holding the lock to be hung; and
if the dummy request does not time out, considering the process holding the lock to be active.

43. The method as recited in claim 41, further comprising:
maintaining a list of inactive processes; and
if the process holding the lock is hung, adding an identifier for that process to the list of inactive processes.

44. The method as recited in claim 41, further comprising removing a process from the list of inactive processes if that process becomes active after that process was added to the list of inactive processes.

45. The method as recited in claim 41, further comprising, if the process is detected to be hung, preventing the process from modifying memory objects.

46. The method as recited in claim 41, wherein said detecting if the process is hung comprises:
sending a client request to the process;
if the client request is not responded to in a first predetermined amount of time, sending a dummy request to the process; and
if the dummy request is not responded to in a second predetermined amount of time, identifying the process as a hung process.

47. The method as recited in claim 46, wherein the first predetermined amount of time and the second predetermined amount of time are approximately equal.

48. The method as recited in claim 41, wherein said detecting if the process is hung comprises:
sending a client request to the process; and
if the client request is not responded to in a predetermined amount of time, identifying the process as a hung process.

49. A computer accessible storage medium, comprising program instructions, wherein the program instructions are computer-executable to:
forward a request received by the application server to a process of the application server; and
detect if the process is hung; and
release one or more memory object locks held by the process in response to detecting the process is hung.

50. A computer accessible storage medium, comprising program instructions, wherein the program instructions are computer-executable to:
forward a request to a process;
detect if the process is hung; and
if the process is hung, prevent further requests from being routed to the hung process; and
prevent the hung process from modifying data.

51. A computer accessible storage medium, comprising program instructions, wherein the program instructions are computer-executable to:
receive a request from a process for a lock for a memory object;
if another process has a lock on the memory object, detect if the process holding the lock is hung;
if the process holding the lock is hung, release the lock on the memory object in response to detecting the process holding the lock is hung, and provide the lock on the memory object to the process requesting the lock; and
if the process is not hung, queue the lock request until the process holding the lock releases the lock or becomes hung.

* * * * *

UNITED STATES PATENT AND TRADEMARK OFFICE
CERTIFICATE OF CORRECTION

PATENT NO. : 7,571,354 B2  
APPLICATION NO. : 10/434939  
DATED : August 4, 2009  
INVENTOR(S) : Susarla et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1706 days.

Signed and Sealed this

Seventh Day of September, 2010

David J. Kappos  
*Director of the United States Patent and Trademark Office*